Aug. 15, 1939          W. W. ALLEN                2,169,783
                       RODENT TRAP
           Original Filed June 4, 1937    2 Sheets-Sheet 1

Inventor
W. W. Allen
By Clarence A. O'Brien
   Hyman Berman
           Attorneys Aug. 15, 1939. W. W. ALLEN 2,169,783
RODENT TRAP
Original Filed June 4, 1937 2 Sheets-Sheet 2
Fig. 3.
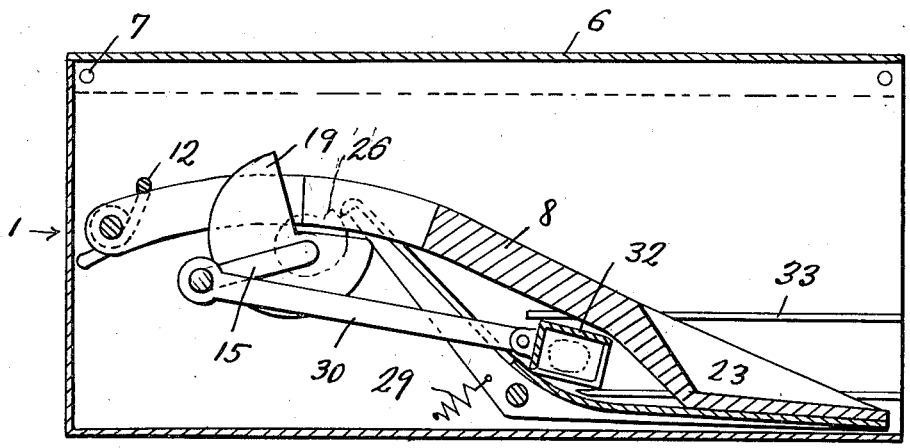
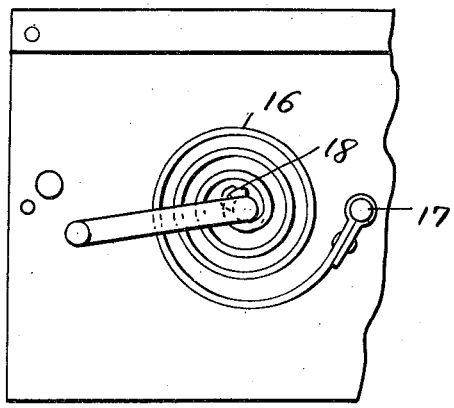
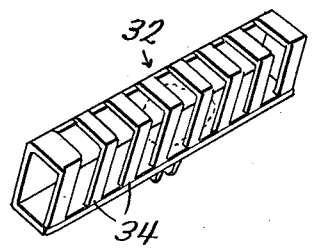
Fig. 4.
Fig. 5.
Inventor
W. W. Allen
By Clarence A. O'Brien
Hyman Berman
Attorneys Patented Aug. 15, 1939

2,169,783

UNITED STATES PATENT OFFICE 2,169,783

RODENT TRAP

Willard W. Allen, Augusta, Ill.

Application June 4, 1937, Serial No. 146,481
Renewed February 16, 1939

3 Claims. (Cl. 43—75)

My invention relates to improvements in rodent traps for use in exterminating rats or mice, and the like.

The principal object of my invention is to provide a device of this character adapted for automatic, repeated operations to kill and eject a number of rodents in succession from the trap after an initial setting thereof.

Another object is to provide a trap operative for the purposes above set forth and for automatic repeated resetting.

Still another object is the provision of a device of the character and for the purposes above indicated which is simple in construction, inexpensive to manufacture, strong and durable, and reliable in operation.

To the accomplishment of the above, and subordinate objects presently appearing, a preferred embodiment of my invention has been illustrated in the accompanying drawings, set forth in detail in the following description, and defined in the claims appended hereto.

Figure 1:
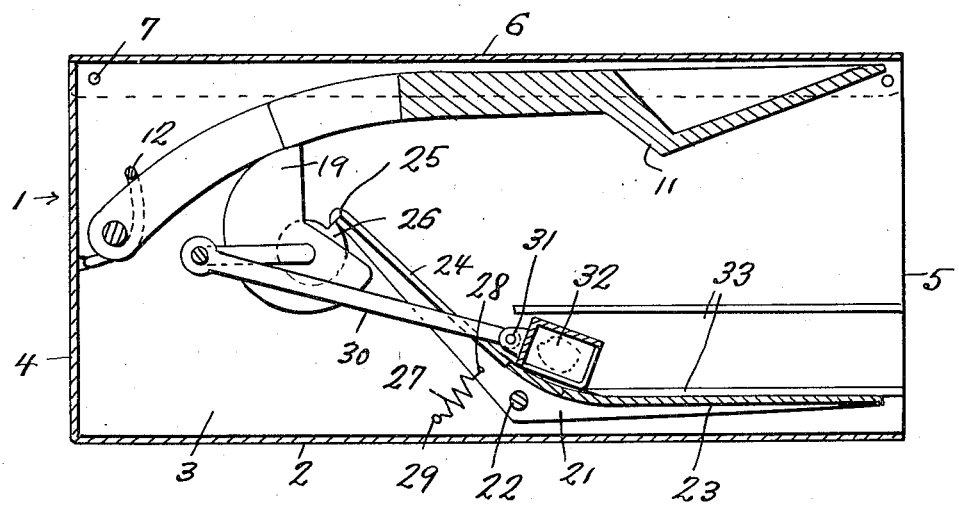
Figure 2:
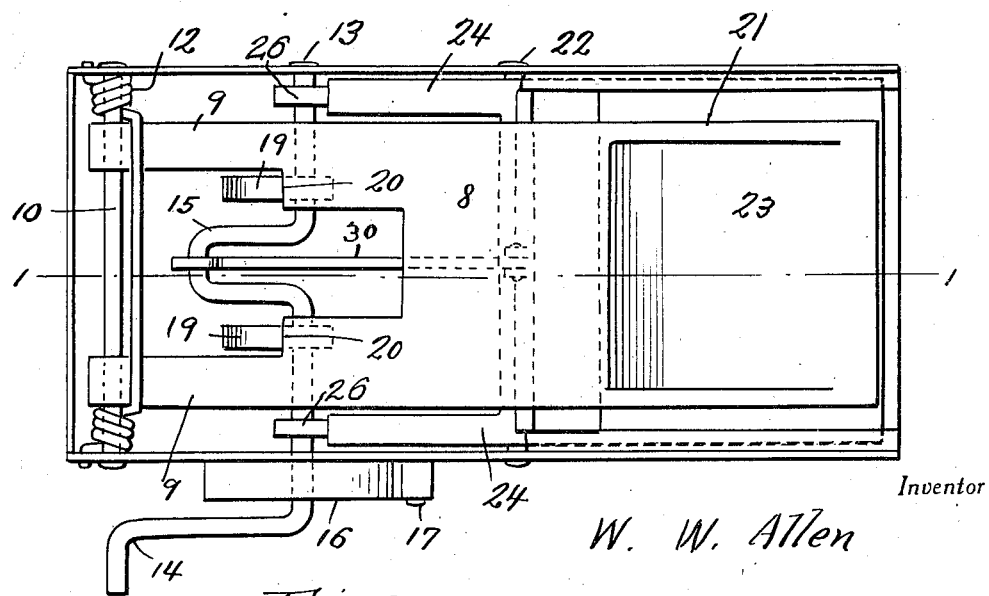

In said drawings:

Figure 1 is a view in vertical longitudinal section of a trap constructed in accordance with my invention the parts being shown in set position, Figure 2 is a view in top plan with the cover of the trap removed, Figure 3 is a view similar to Figure 1 illustrating the relation of the parts of the trap in an intermediate phase of operation thereof, Figure 4 is a fragmentary view in side elevation of the rear end of the trap, and Figure 5 is a view in perspective of a combined bait holder and ejector member.

Describing my invention in detail, with reference to the drawings by numerals, in the preferred embodiment thereof my improved trap comprises an elongated substantially rectangular casing 1, preferably of metal, having a bottom wall 2, side walls 3, a rear end wall 4, an open front end 5 and a cover 6 hinged at one end to the side walls 3 as at 7.

Within the casing 1 is a vertically swingable plate like dead fall 8 extending substantially from end to end of said casing and having a bifurcated rear end providing rearwardly extending side arms 9 on said dead fall by means of which the latter is swingably mounted at the rear of the casing 1, in the longitudinal center thereof, upon a transverse shaft 10 fixed at its opposite ends in the side walls 3 respectively. The front end of the dead fall 8 is shaped to provide a transversely extending angular under face 11 thereon for a purpose presently seen. A coil spring 12 overlying the arms 9 and having its opposite ends coiled around the shaft 10 and anchored in the side walls 3 tensions the dead fall 8 for downward movement. Journalled in the side walls 3 in advance of the shaft 10, and slightly below the latter, is a transverse crank shaft 13 underlying the arms 9 and including a handcrank 14 at one side of the casing 1, exteriorly thereof, and an intermediate crank portion 15 adapted to revolve between the arms 9. A convolute spring 16 is attached at its opposite ends to one side wall 3 and to the shaft 13, as at 17 and 18 respectively, to be wound up by rotation of said shaft in the proper direction i. e., clockwise, as viewed in Figure 4. Fast on the shaft 13, upon opposite sides of the center thereof, is a pair of snail cams 19 designed to wipe under a pair of shoulders 20 on the arms 9, respectively, and to thereby elevate said dead fall 8 against the tension of the spring 12. The shaft 13 and cams 19 are designed for rotation through single revolution cycles of movement, from a full cycle position, under the reaction of the wound spring 16, to release the deadfall 8 in its elevated position and subsequently re-elevate the same during each cycle of operation of said shaft and cams. Such rotation of the shaft 13 and cams 19 is controlled by trip mechanism as follows.

Below the deadfall 8, and in the front part of the casing 1, is a treadle 21 mounted for vertical rocking movement, from a normal position, on a transverse shaft 22 fixed at its opposite ends in the side walls 3 adjacent the bottom wall 2. The treadle 21 comprises a plate-like front tread end 23 and a pair of upwardly inclined rear side arms 24 terminating in hooked ends 25 extending above the crank shaft 13. Fast on the crank shaft 13, in the planes of the treadle arms 24, respectively, is a pair of toothed cams 26 adapted to be engaged by the hooked ends 25 of said arms, in the full cycle position of the shaft 13 and cams 19, to hold the crank shaft 13 and said cams 19 against rotation at the end of each cycle of operation thereof. A pair of tension springs, as at 27, suitably secured to the treadle arms 24, and to the side walls 3, as at 28, and 29, urge the treadle 21 toward normal position and the hooked ends 25 toward engaging relation to said cams 26. As will be understood, the normal position of the treadle 21 is established by engagement of the hooked ends 25 with said cams 26.

A piston rod 30 extends forwardy of the casing 1 from the crank portion 15, between the treadle arms 24, in overlying relation to the front end of the treadle 21 and has pivotally secured to its front end, as at 31, an elongated substantially rectangular bait holder 32 having its opposite ends slidably mounted in a pair of guides 33 extending lengthwise along the side walls 3, respectively, and suitably secured thereto intermediate the front end of said treadle 21 and the dead fall 8. As will be manifest, the bait holder 32 is adapted for advance and retraction relative to the open end 5 of the casing 1. The bait holder 32 and piston rod 30 are designed to act as ejector means and to this end the crank portion 15 is arranged to advance and retract said bait holder 32 during each cycle of movement of the shaft 13 from full cycle position, the advance operation occurring during elevation of the dead fall 8. In this connection, the arrangement of the parts is such that the bait holder 32 in its retracted position is in the rear of the face 11 of the dead fall 8 and clear thereof.

The bait holder 32 is provided with a series of slots 34 for the insertion of suitable bait therein from the front of the trap.

Referring now to the operation of the invention, the initial setting of the trap is accomplished by winding up the spring 16 through the medium of the crank 14. During this winding operation the hooked ends 25 of the treadle arms 24 ratchet over the cams 26 until the crank 14 is released at which point said hooked ends engage over the toothed cams 26 under the urge of the springs 27 to hold the shaft 13 against rotation under reaction of the spring 16 and, together with the cams 19, in full cycle position illustrated in Figure 1. In this position of the parts, the treadle 21 is in normal position, the cams 19 positioned under the shoulders 20 to elevate the dead fall 8 and to release said dead fall upon initial rotation of the shaft 13 and said cams 19. The crank portion 15, the piston rod 30, and the bait holder 32 are in retracted position in the guides 33 and in the rear of the tread end 23, and also of the under face 11 of the dead fall 8. The trap is now set for operation. As soon as a rodent enters the open end 5 of the casing 1 and bears its weight upon the tread end 23 of the treadle 21, the latter is rocked from normal position against the tension of the springs 27, thereby disengaging the hooked ends 25 from the cams 26. The shaft 13, cams 19, and 26, are now rotated through a single cycle of operation during which the following operations take place. Upon initial movement of the cams 19 from full cycle position said cams move from beneath the shoulders 20, thereby releasing the deadfall 8 for downward movement under the urge of spring 12 onto the back of the rodent. At this point, it should be explained that the spring 12 is designed to react against the deadfall 8 so as to cause the downstroke of the latter to kill the rodent. Manifestly, during the initial rotation of the shaft 13, the bait holder 32 is advanced slightly, the parts being arranged to permit such advancement initially without interference between the bait-holder and deadfall 8 and the latter being held in slightly elevated position by engagement of the inclined under face 11 with the carcass of the rodent. Shortly after release of the deadfall 8 by the cams 19, and descent of said deadfall, said cams 19 again engage under the shoulders 20 and impart elevating force to the deadfall thereby releasing the rodent from between said deadfall and the tread end 23 of the treadle 21.

Simultaneously with the elevation of the deadfall 8 the bait holder 32 is moved forwardly, or advanced, against the carcass of the rodent and the latter is ejected thereby from the casing 1. In the last half of the cycle of movement of the shaft 13 and cams 19 and 26, the bait holder 32 is retracted to starting position. As the shaft 13, cams 19 and 26 reach full cycle position the hooked ends 25 of the treadle arms 24 snap over the toothed cams 26 under the action of the springs 27 thereby resetting the parts of the trap as will be clear. The trap is now set for repeat operation as previously described. The under face 11 of the deadfall 8 is a particular feature of the invention being designed to define a sharp edge for impact against the body of the rodent to kill the same.

The operation of my invention, together with the details of construction thereof, will be clear from the foregoing without further explanation.

Manifestly, the invention, as described, is susceptible of modification without departing from the inventive concept, and it is to be understood that right is herein reserved to all such modifications falling within the scope of the claims appended hereto.

What I claim is:

1. A rodent trap including a deadfall, a treadle, and means to automatically operate said deadfall repeatedly under control of said treadle, and including a reactive motor, a crank shaft beneath said deadfall and operative by said motor, a cam fast on said shaft for engagement with the underside of said deadfall and operative as an incident to single revolution cycles of operation thereof to elevate and release said deadfall, and cooperating trip devices on said shaft and treadle, respectively, for blocking operation of said shaft and cam at the end of each cycle of operation thereof.

2. A rodent trap including a deadfall, a treadle beneath said deadfall operative under the weight of a rodent thereon, an ejector adapted for reciprocation over said treadle, and means to automatically operate said deadfall and said ejector under control of said treadle and including a reactive motor, a crankshaft operative by said motor, cams fast on said shaft and operative as an incident to single revolution cycles of operation thereof to elevate and release said deadfall, a piston rod operatively connected to said crankshaft and ejector, respectively, and cooperating trip devices on said shaft and treadle, respectively, for blocking operation of said shaft and cams at the end of each cycle of operation thereof.

3. A rodent trap including a deadfall, a treadle beneath said deadfall operative under the weight of a rodent thereon, an ejector adapted for reciprocation over said treadle, and means to automatically operate said deadfall and said ejector under the control of said treadle and including a reactive motor, a crank shaft operative by said motor, devices fast on said shaft and operative as an incident to single revolution cycles of operation thereof to elevate and release said deadfall, a piston rod operatively connected to said crank shaft and ejector, respectively, and cooperating devices on said shaft and treadle, respectively, for blocking operation of said shaft and devices thereon at the end of each cycle of operation thereof.

WILLARD W. ALLEN.